United States Patent
Bomphrey et al.

(10) Patent No.: US 11,748,997 B2
(45) Date of Patent: Sep. 5, 2023

(54) OBSTACLE DETECTION

(71) Applicant: The Royal Veterinary College, London (GB)

(72) Inventors: Richard Bomphrey, London (GB); Nathan Phillips, London (GB); Toshiyuki Nakata, London (GB); Simon Walker, London (GB)

(73) Assignee: The Royal Veterinary College, London (GB)

( * ) Notice: Subject to any disclaimer, the term of this patent is extended or adjusted under 35 U.S.C. 154(b) by 712 days.

(21) Appl. No.: 16/626,414

(22) PCT Filed: Jul. 2, 2018

(86) PCT No.: PCT/GB2018/051856
§ 371 (c)(1),
(2) Date: Dec. 24, 2019

(87) PCT Pub. No.: WO2019/002892
PCT Pub. Date: Jan. 3, 2019

(65) Prior Publication Data
US 2020/0143178 A1    May 7, 2020

(30) Foreign Application Priority Data
Jun. 30, 2017   (GB) ..................... 1710538

(51) Int. Cl.
*G05D 1/00*    (2006.01)
*G06V 20/58*   (2022.01)
(Continued)

(52) U.S. Cl.
CPC .............. *G06V 20/58* (2022.01); *B64C 13/16* (2013.01); *B64C 39/024* (2013.01);
(Continued)

(58) Field of Classification Search
CPC ...... G06V 20/58; B64C 13/16; B64C 39/024; B64C 2201/141; B64C 2230/14;
(Continued)

(56) References Cited

U.S. PATENT DOCUMENTS

| 7,260,022 B2 | 8/2007 | Schliep et al. |
| 2005/0041529 A1* | 2/2005 | Schliep ................. G01S 15/931 367/99 |

(Continued)

FOREIGN PATENT DOCUMENTS

| DE | 102011079707 A1 | 1/2013 |
| EP | 2386925 A1 | 11/2011 |

(Continued)

OTHER PUBLICATIONS

International Search Report for Application No. PCT/GB2018/051856 dated Oct. 2, 2018, 4 pages.
English language abstract for DE 10 2011 079 707 extracted from espacenet.com database on Jan. 13, 2020, 1 page.
English language abstract for WO 03/012475 extracted from espacenet.com database on Jan. 13, 2020, 2 pages.

*Primary Examiner* — Shardul D Patel
(74) *Attorney, Agent, or Firm* — Howard & Howard Attorneys PLLC (57) ABSTRACT

A vehicle includes a propulsion unit configured to move the vehicle and to change a characteristic of the environment of the vehicle. The vehicle also includes a proximity sensor configured to detect the characteristic of the environment of the vehicle. The characteristic of the environment is changed by operation of the propulsion unit. The vehicle further includes obstacle detection circuitry configured to determine a presence of an obstacle in the vicinity of the vehicle based on a comparison between the detected characteristic of the environment and a reference value.

19 Claims, 6 Drawing Sheets

(51) Int. Cl.
*B64C 13/16* (2006.01)
*B64C 39/02* (2023.01)
*G05D 1/02* (2020.01)
*G08G 1/16* (2006.01)

(52) U.S. Cl.
CPC ........... *G05D 1/0255* (2013.01); *G08G 1/165* (2013.01); *B64C 2230/14* (2013.01); *B64U 2201/10* (2023.01)

(58) Field of Classification Search
CPC ........ B64C 2201/027; B64C 2201/108; B64C 2201/165; G05D 1/0255; G05D 1/00; G08G 1/165; G08G 5/0021; G08G 5/045; G08G 5/0069; G08G 5/04; G01S 15/60; G01S 7/52004; G01S 15/08; G01S 15/87; G01S 15/93; G01S 15/58
USPC ...................................................... 244/17.11
See application file for complete search history.

(56) References Cited

U.S. PATENT DOCUMENTS

| | | | |
|---|---|---|---|
| 2011/0264314 A1* | 10/2011 | Parras | G05D 1/0676 701/16 |
| 2016/0070264 A1 | 3/2016 | Hu et al. | |
| 2017/0061813 A1* | 3/2017 | Tao | G09B 9/08 |
| 2017/0219686 A1* | 8/2017 | Xie | G01S 11/14 |
| 2017/0330478 A1* | 11/2017 | Zhang | G09B 9/24 |
| 2019/0164435 A1* | 5/2019 | Cui | B64C 39/024 |

FOREIGN PATENT DOCUMENTS

| | | |
|---|---|---|
| GB | 2493278 A | 1/2013 |
| GB | 2493278 B | 8/2016 |
| WO | 03012475 A1 | 2/2003 |
| WO | 2016123746 A1 | 8/2016 |

\* cited by examiner

OBSTACLE DETECTION

CROSS-REFERENCE TO RELATED APPLICATIONS

The present application is the National Stage of International Patent Application No. PCT/GB2018/051856, filed on Jul. 2, 2018, which claims priority to and all the benefits of Application No. GB 1710538.8, filed on Jun. 30, 2017, which are both hereby expressly incorporated herein by reference in their entirety.

This invention relates to sensing means for detecting obstacles in the vicinity of an apparatus.

BACKGROUND

Unmanned Air Systems (UAS) are used in many industries for numerous applications such as remote inspection in hazardous environments (i.e. damaged nuclear reactors), surveying, search-and-rescue and reconnaissance. As the uses for these devices continue to grow they are also becoming more autonomous and capable of executing tasks without human involvement. To be fully autonomous, a UAS platform must be capable of reliably detecting nearby obstacles to avoid collision, and thus, the vehicle must have a means of determining object proximity.

Existing proximity sensors are generally costly in terms of either their computational or power requirements, and suitable sensors do not presently exist for small platforms (i.e. pico-UAS). Examples of current on-board sensors are optical sensors such as cameras, or radar sensors.

The present invention provides at least an alternative to proximity sensors of the prior art.

BRIEF SUMMARY OF THE DISCLOSURE

In accordance with the present disclosure there is provided a vehicle comprising a propulsion unit configured to move the vehicle and to change a characteristic of the environment of the vehicle. The vehicle further comprises a proximity sensor configured to detect the characteristic of the environment of the vehicle. The characteristic of the environment is changed by operation of the propulsion unit. The vehicle further comprises obstacle detection circuitry configured to determine a presence of an obstacle in the vicinity of the vehicle based on a comparison between the detected characteristic of the environment and a reference value.

Thus, there is provided a vehicle having a proximity sensor that has the potential to have much lower mass, and be computationally less expensive and consume less power than existing sensors. The change in the characteristic of the environment detected by the proximity sensor originates from an existing part of the vehicle and as a result of propulsion of the vehicle. In embodiments, the existing part of the vehicle is part of the propulsion unit. Therefore, an obstacle detection system need not comprise an additional emitter for the vehicle, and can be considerably smaller and lighter than previous systems. Accordingly, obstacle proximity detection capabilities are possible on very small platforms. In the case of air vehicles, this allows increased flight times and payload capacity through the reduced sensor mass and power.

The propulsion unit may comprise one or more wheels, tracks, legs, fans, jets, propellers, rotors, flapping wings, paddles. In some embodiments, the propulsion unit may rely on movement of a component of the vehicle relative to the surrounding fluid medium to generate locomotion of the vehicle. In other embodiments, the propulsion unit may rely on movement of a component of the vehicle relative to a supporting surface (for example, the ground) to generate locomotion of the vehicle.

It will be understood that the characteristic of the environment of the vehicle may be a pressure field surrounding the vehicle, a sound wave incident on the vehicle, or any other characteristic of the environment of the vehicle which is modified by operation of the propulsion unit of the vehicle. The characteristic of the environment of the vehicle may be changed by the operation of a power plant, such as a motor or engine, supplying power to the propulsion unit of the vehicle. Alternatively or additionally, the characteristic of the environment of the vehicle may be changed by the operation of a locomotion component of the propulsion unit, such as a propeller, fan, flapping wing, or any other locomotion mechanism. Alternatively or additionally, the characteristic of the environment of the vehicle may be changed only indirectly by operation of the propulsion unit. For example, an interaction of a fluid surrounding the vehicle with a component of the vehicle away from the propulsion unit may be modified when the propulsion unit is operated. The component of the vehicle away from the propulsion unit may be an outer skin of the vehicle.

It will be understood that the proximity sensor is any sensor usable, in conjunction with the obstacle detection circuitry, to detect the presence of an obstacle in the vicinity of the vehicle.

The vehicle may further comprise at least one further proximity sensor separated from the proximity sensor for detecting the characteristic of the environment at a different location around the vehicle. Thus, there may be multiple proximity sensors located at different locations around the vehicle. This allows detection of an obstacle on several sides of the vehicle. If there are more than three proximity sensors, a location of the detected obstacle may be determined by triangulation.

The proximity sensors may be distributed about an outer perimeter of the vehicle. At least one of the proximity sensors may be provided at a ground-facing surface of the vehicle. At least one of the proximity sensors may be provided at an opposite surface of the vehicle to a ground-facing surface of the vehicle. The proximity sensor may be located directly on the vehicle. Alternatively, the proximity sensor may be located on a mount, spacing the proximity sensor outwards from an outer surface of the vehicle, whereby to detect the characteristic of the environment of the vehicle at a position outwards from the outer surface of the vehicle. Thus, an approaching obstacle can be detected at a greater distance from the outer surface of the vehicle, allowing more time to adjust a trajectory of the vehicle based on detection of the obstacle.

The proximity sensor may be for detecting a first characteristic of the environment of the vehicle. The at least one further proximity sensor may be for detecting a second characteristic of the environment of the vehicle. The first characteristic of the environment of the vehicle may be different from the second characteristic of the environment of the vehicle. Thus, different characteristics of the environment can be used to provide reliable obstacle detection in a range of environmental conditions and accuracy can be improved by sensor fusion of the proximity sensor and the further proximity sensor. The presence of the obstacle in the vicinity of the vehicle may be determined based on a comparison between the detected first characteristic of the environment of the vehicle with the first reference value and a comparison between the detected second characteristic of the environment of the vehicle with the second reference value.

The reference value(s) may be stored on a memory of the vehicle. In other embodiments, the reference value(s) may be received from a further device, connected to the vehicle. In yet further embodiments, the reference value may be determined based on an output from a further sensor. The reference value may be indicative of a normal mode of operation of the proximity sensor(s) in the absence of an obstacle. Alternatively, the reference value may be indicative of an obstructed mode of operation of the proximity sensor(s) in the presence of an obstacle. The reference value(s) may be determined previously during a calibration operation of the vehicle.

The proximity sensor and/or the at least one further proximity sensor may be a pressure sensor. It will be understood that the term "pressure sensor" refers to any sensor responsive to a variation in the local pressure. The pressure sensor may be responsive to a change in an ambient pressure. The pressure sensor may comprise a first pressure port and a second pressure port, spaced from the first pressure port and the pressure sensor may be responsive to a change in a relative pressure between the first pressure port and the second pressure port. The pressure sensor may be responsive to a pressure wave incident thereon. An output of the pressure sensor may be responsive to a frequency of a pressure wave incident thereon. Thus, the pressure sensor can take a variety of different forms, all of which are responsive to variations in the local pressure.

The pressure sensor may be a pitot tube. The pressure sensor may be a strain-gauge pressure plate. The pressure sensor may be a membrane.

The proximity sensor may be a velocity sensor to measure a velocity of a fluid flow field surrounding the vehicle. The velocity sensor may be a cup anemometer, a deflecting hair velocity sensor, a laser Doppler velocity sensor or a particle image velocimetry (PIV) sensor.

The characteristic of the environment may be a property of a fluid flow field around the vehicle, the fluid flow field changed by operation of the propulsion unit. Thus, the propulsion unit may alter the fluid flow field as part of the normal production of thrust and/or lift. Furthermore, the changes in the fluid flow field will be different in the case where an obstacle is present in the vicinity of the vehicle. It will be understood that the fluid flow field need not have a bulk movement relative to the vehicle. The property of the fluid flow field around the vehicle may be a local flow velocity of the fluid surrounding the vehicle.

The property of the fluid flow field around the vehicle may be a pressure of the fluid surrounding the vehicle.

The obstacle detection circuitry may be in the form of one or more processors and a memory having instructions stored thereon to cause the one or more processors to carry out the actions of the obstacle detection circuitry. The obstacle detection circuitry may be implemented in hardware or software.

The obstacle detection circuitry may be configured to compare the detected property of the fluid flow field to a reference value. The obstacle detection circuitry may be further configured to determine the obstacle is present if the detected property of the fluid flow field differs from the reference value by more than a predetermined threshold amount. Alternatively, the obstacle detection circuitry may be further configured to determine the obstacle is present if the detected property of the fluid flow field differs from the reference value by less than a predetermined threshold amount.

In other embodiments, the obstacle detection circuitry may be configured to compare a characteristic of the detected property of the fluid flow field to a reference value. For example, the characteristic of the detected property of the fluid flow field may be a standard deviation of the pressure of the fluid flow field.

The obstacle detection circuitry may be configured to determine a distance from the vehicle to the obstacle based on the difference between the detected property of the fluid flow field and the reference value. Where the vehicle comprises a plurality of proximity sensors, the obstacle detection circuitry may be configured to determine a location of the obstacle based on the detected property of the fluid flow field detected by each of the proximity sensors.

The pressure sensor may be a microphone. The characteristic of the environment may be a pressure wave within the fluid surrounding the vehicle, the pressure wave being a reflection of a sound generated by operation of the propulsion unit. Thus, detection of the sound inherently produced by the propulsion unit of the vehicle may be used to determine the proximity and/or location of obstacles in the vicinity of the vehicle. For example, where the vehicle is an airborne vehicle approaching a ground surface from above, the sound detected by a ground-exposed microphone will increase as the sound reflected back towards the microphone from the ground will travel less far, resulting in reduced dissipation and attenuation of the sound, compared to the situation where the ground is further away. Thus, it is possible to establish the existence of an obstacle near the vehicle purely by analysing an amplitude of the sound received by the microphone.

In another embodiment, the frequency of the sound generated by operation of the propulsion unit may be known. Thus, the detection of the frequency of the sound received by the microphone may be used to determine a presence of an obstacle, due to the presence of a Doppler shift in the frequency of the received sound reflected by the obstacle.

In a further embodiment, the microphone may be configured to detect a sound generated by a fluctuating pressure wave impacting upon the obstacle. For example, when the vehicle is an airborne vehicle approaching a ground surface from above in a controlled descent, a fluctuating downwash from the propulsion unit on the ground surface will generate a sound originating from the ground surface. Again, detection of this sound can be indicative of the presence of the obstacle (i.e. the ground) in the vicinity of the vehicle.

The microphone may be a directional microphone. Thus, it is possible to determine a location of the obstacle, even with only a single microphone.

The sound may be generated by a power plant of the propulsion unit. Thus, the sound may be generated by an engine or a motor of the propulsion unit.

The sound may be generated by a movement of a surface of the vehicle relative to the fluid surrounding the vehicle during operation of the propulsion unit.

The surface may be a propulsive surface of the propulsion unit. The propulsive surface may be a surface of a propeller, fan, turbine, rotor, or similar. Alternatively, the surface may be a different surface of the vehicle, not part of the propulsion unit.

The vehicle may further comprise a calibration microphone, arranged to detect the sound substantially at the location of generation. The obstacle detection circuitry may be configured to determine the presence of the obstacle in the vicinity of the vehicle based on the detected pressure wave by the microphone and the detected sound by the calibration microphone. Thus, the obstacle detection circuitry need not receive an input from a propulsion control system, simplifying integration of the system into existing vehicles. The calibration microphone allows the obstacle detection circuitry to adapt to variations in the generated sound caused by variations on the propulsive demands of the propulsion unit.

The obstacle detection circuitry may be configured to compare a characteristic of the detected pressure wave within the fluid to a reference value. The obstacle detection circuitry may be further configured to determine the obstacle is present if the characteristic of the detected pressure wave is greater than the reference value by more than a predetermined threshold amount. Alternatively, the obstacle detection circuitry may be further configured to determine the obstacle is present if the characteristic of the detected pressure wave is within a predetermined threshold amount of the reference value. Where the detected pressure wave is in the form of a sound present within the fluid, the characteristic of the sound of the fluid flow field may be an acoustic feature of the sound. For example, the acoustic feature may be an amplitude, harmonic, a frequency, or relative magnitudes of more than one harmonic of the sound.

The obstacle detection circuitry may be configured to determine a distance from the vehicle to the obstacle based on the difference between the characteristic of the detected pressure wave and the reference value.

The obstacle detection circuitry may be further configured to determine a position of the obstacle relative to the vehicle. The position may be determined by triangulation of proximity sensor data.

The vehicle may be an airborne vehicle. Thus, the vehicle can be configured to detect an obstacle in front, behind, above, to either side, or below the vehicle.

The obstacle detection circuitry may be further configured to output the obstacle detection to a navigation control system of the vehicle. The navigation control system may be configured to control the propulsion unit of the vehicle to avoid the detected obstacle. Thus, the obstacle detection circuitry can be part of a sense and avoid system for the vehicle.

The navigation control system may be configured to control the propulsion unit of the vehicle to position the vehicle substantially at a predetermined distance from the obstacle. For example, where the obstacle is a ground surface, the navigation control system may be configured to control the propulsion unit of the vehicle to position the vehicle substantially at the predetermined distance off the ground surface. The predetermined distance may be in a direction substantially normal to a surface of the obstacle, for example normal to the ground surface. The navigation control system may be configured to control the propulsion unit of the vehicle to move the vehicle relative to the obstacle, whilst substantially maintaining the predetermined distance from the obstacle. In other words, the vehicle may be configured to perform a ground-following manoeuvre, or a wall-following manoeuvre, such that the vehicle remains at a substantially constant distance from the obstacle, whilst moving relative to the obstacle. The obstacle may be a substantially planar surface. The obstacle may be a wall. The obstacle may be a substantially vertical surface. The obstacle may be a ground surface, for example a floor. The obstacle may be an underside of a roof surface, for example a ceiling.

The predetermined distance is typically greater than zero centimetres. The predetermined distance may be greater than 30 centimetres. The predetermined distance may be greater than 1 metre. The predetermined distance may be less than 10 metres. The predetermined distance may be less than 5 metres. For large and heavy vehicles, it will be understood that the predetermined distance may be greater than 10 metres. For small and lightweight vehicles, it will be understood that the predetermined distance may be less than 30 centimetres.

Where the vehicle is an airborne vehicle held airborne off the ground by a rotor, the predetermined distance may be less than five times a diameter of the rotor. The predetermined distance may be less than three times the diameter of the rotor. The predetermined distance may be greater than half the diameter of the rotor. The predetermined distance may be greater than the diameter of the rotor.

Where the vehicle is an airborne vehicle held airborne off the ground by one or more flapping wings, the predetermined distance may be less than five times a length of a one of the one or more flapping wings. The predetermined distance may be less than three times the length of the one of the one or more flapping wings. The predetermined distance may be greater than half the length of the one of the one or more flapping wings. The predetermined distance may be greater than the length of the one of the one or more flapping wings.

Typically, where the characteristic of the environment of the vehicle is a characteristic of the fluid flow field around the vehicle, in the form of a pressure at the vehicle, the predetermined distance is such that an induced change in the fluid flow field as a result of the obstacle at the predetermined distance is reliably detectable at the vehicle. For example, a difference between the pressure at the pressure sensor in the absence of the obstacle, and with the obstacle at the predetermined distance may be greater than 10% of the pressure at the pressure sensor in the absence of the obstacle. The difference between the pressure at the pressure sensor in the absence of the obstacle, and with the obstacle at the predetermined distance may be greater than 20% of the pressure at the pressure sensor in the absence of the obstacle. The difference between the pressure at the pressure sensor in the absence of the obstacle, and with the obstacle at the predetermined distance may be less than 90% of the pressure at the pressure sensor in the absence of the obstacle. The difference between the pressure at the pressure sensor in the absence of the obstacle, and with the obstacle at the predetermined distance may be less than 70% of the pressure at the pressure sensor in the absence of the obstacle.

Although the preceding paragraph relates to pressure differences, it will be understood that were the characteristic of the environment of the vehicle is a sound wave incident on the vehicle, the predetermined distance is such that a reflected sound wave, originating from the propulsion system and reflected by the obstacle, is reliably detectable at the vehicle. In other words, the predetermined distance is less than or equal to the maximum distance from the obstacle at which the presence of the obstacle can be determined based on the comparison between the detected characteristic of the environment and the reference value.

When the characteristic of the environment surrounding the vehicle is the fluid flow field, the obstacle detection circuitry may be further configured to determine and output speed, flow direction, and/or altitude of the vehicle based on signals received from the pressure sensor.

When the proximity sensor is a microphone, the obstacle detection circuitry may be further configured to output ambient acoustic information of the vicinity of the vehicle.

Viewed from another aspect, the present disclosure provides apparatus for detecting an obstacle in the vicinity of a vehicle. The apparatus comprises a sensor input for receiving a signal from a proximity sensor. The apparatus further comprises obstacle detection circuitry configured to determine a presence of the obstacle in the vicinity of the vehicle based on a comparison between the received signal from the proximity sensor and a reference value. The proximity sensor is configured to detect a characteristic of the environment of the vehicle, the characteristic of the environment changed by operation of a propulsion unit of the vehicle.

It will be understood that the apparatus may include any of the features described hereinbefore.

Viewed from a further aspect, the present disclosure provides a non-transitory computer readable medium storing a program thereon to cause a processor to execute an obstacle detection method of a vehicle. The obstacle detection method comprises receiving a signal from a proximity sensor mounted at the vehicle and responsive to a characteristic of an environment of the vehicle, the environment changed by operation of a propulsion unit of the vehicle. The obstacle detection method further comprises determining a presence of an obstacle in the vicinity of the vehicle based on a comparison between the received signal from the proximity sensor and the reference value.

Viewed from a yet further aspect, the present disclosure provides a method of determining a presence of an obstacle in the vicinity of a vehicle. The method comprises, operating a propulsion unit of the vehicle to move the vehicle, wherein operating the propulsion unit causes a change in a characteristic of the environment of the vehicle. The method further comprises receiving, by a proximity sensor of the vehicle, at least one value representative of the characteristic of the environment of the vehicle. The method further comprises determining the presence of the obstacle in the vicinity of the vehicle based on a comparison between the at least one value representative of the characteristic of the environment and a reference value.

It will be understood that the method may include any of the features described hereinbefore.

BRIEF DESCRIPTION OF THE DRAWINGS

Embodiments of the invention are further described hereinafter with reference to the accompanying drawings, in which.

DETAILED DESCRIPTION

The presently described vehicle and apparatus can be used to detect obstacles in the vicinity of a vehicle without requiring any additional emitters, other than the components already present on the vehicle. Instead, the inventors have realised that the components already present on the vehicle, for example as part of a propulsion unit of the vehicle, can also function as emitters to emit energy into the vicinity of the vehicle. The emitted energy will be modulated by the presence of one or more obstacles in the vicinity of the vehicle. In other words, a characteristic of the environment of the vehicle will be changed by operation of the propulsion unit. Thus, a sensor, responsive to the emitted energy, can detect the presence of the obstacles by detecting the characteristic of the environment and the changes thereto.

Figure 1:
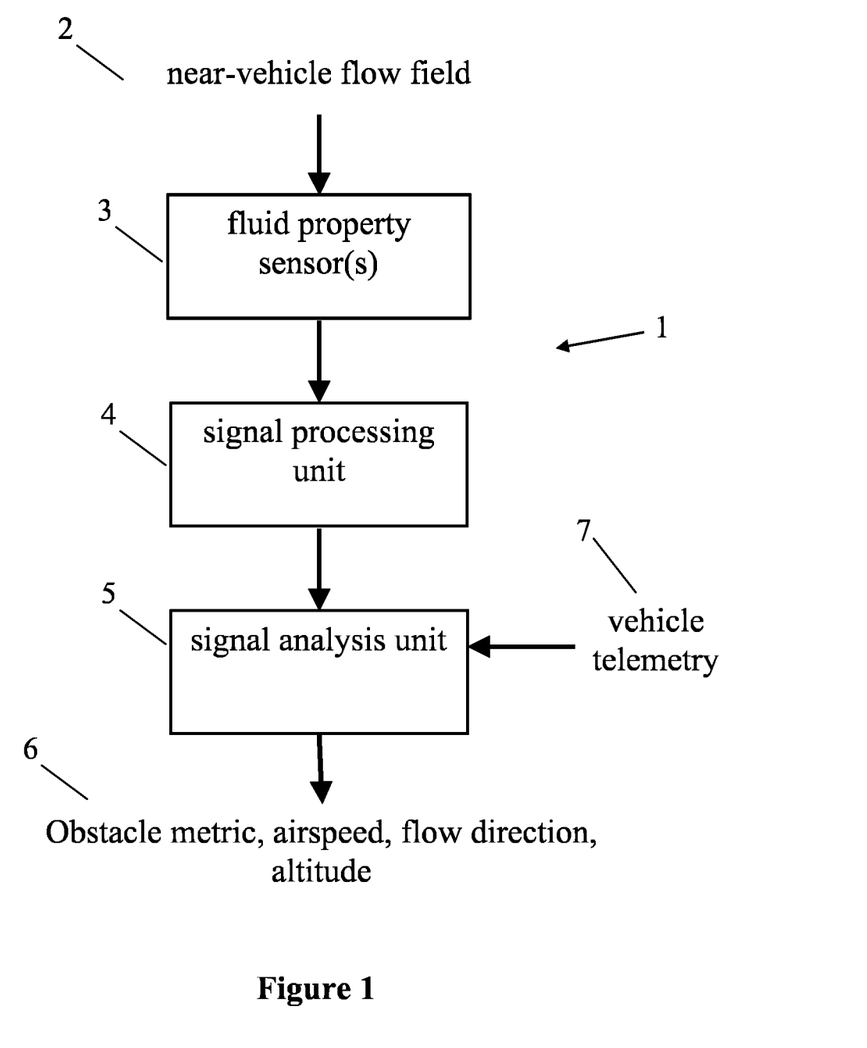
FIG. 1 is a flow diagram illustrating a system for detecting an obstacle in the vicinity of a vehicle, based on an induced fluid flow field around the vehicle.

FIG. 1 is a flow diagram illustrating a system 1 for detecting an obstacle in the vicinity of a vehicle, based on an induced fluid flow field around the vehicle. A characteristic of an environment of the vehicle, such as a fluid flow field in the form of a near-vehicle flow field 2 is induced by operation of a propulsion unit of the vehicle. For example, where the vehicle is an airborne vehicle, operation of a propeller of the propulsion unit of the vehicle induces a change in a property of the fluid flow field surrounding the vehicle.

In this example, the vehicle (not shown) comprises a plurality of proximity sensors 3 distributed around the vehicle to measure a property of a fluid flow field in the form of a near-vehicle flow field 2 surrounding the vehicle. The provision of the plurality of proximity sensors ensures the property of the fluid flow field is measured in multiple locations around the vehicle. In this example, the proximity sensors 3 are fluid property sensors which can be any type of sensor for measuring fluid flow velocity, pressure, or a combination of the two for the fluid flow field 2 around the vehicle. In this example, the raw sensor values from the proximity sensors 3 are processed by a signal processing unit 4. The signal processing unit 4 applies one or more filters to the raw sensor values to smooth the raw sensor values from the proximity sensors 3 and to reduce noise levels raw sensor values. However, it will be appreciated that the signal processing unit 4 is entirely optional and in some examples, may not be necessary. After any signal processing is performed, the signal processed sensor values are analysed by a signal analysis unit 5 to determine at least the presence or absence of an obstacle in the vicinity of the vehicle. In examples, the signal analysis unit 5 also determines an indication of the proximity of the obstacle, including a distance and/or relative direction of the obstacle to/from the vehicle.

In order to determine a distance and/or bearing of the obstacle from the vehicle, it will be understood that the relationship between sensor values and obstacle bearing, and/or sensor values and distance relative to the vehicle must be known. In one example, a calibration is performed in which sensor values are recorded when a reference obstacle is located at a known obstacle proximity bearing and distance (i.e. obstacle in front of vehicle, obstacle below vehicle). The calibration can also be performed to include interfering environmental effects such as the presence of wind. By identifying specific combinations of sensor values and conditions (e.g. certain sensor values surpass certain predetermined thresholds) that correspond to specific proximity bearings and distances obtained during the calibration, both the direction and distance of an obstacle can then be obtained from the measured flow field properties. Therefore, the signal analysis unit 5 can output one or more metrics 6 in the form of metrics characterising any obstacles in the vicinity of the vehicle.

In some examples, the signal analysis unit 5 also receives, as an input, an indication of the vehicle telemetry 7. The vehicle telemetry 7 can include the vehicle velocity (ground speed), acceleration and attitude as provided by the vehicle Inertial Measurement Unit (IMU), and power plant thrust level(s). The information in the vehicle telemetry 7 can be combined with the sensor values in the signal analysis unit 5 to provide a more accurate determination of the one or more metrics characterising the obstacles in the vicinity of the vehicle. For example, it is known that flow property sensor values may vary with ground speed and attitude. This may interfere with the obstacle detection system and lead to incorrect determinations of the presence or absence of an obstacle in the vicinity of the vehicle. By including flight speed, attitude and thrust level(s) as additional input variables with the sensor values in the signal analysis unit 5, it is possible to improve the reliability of the determined obstacle bearing and distance. Thus, the interfering effects from such sources on proximity detection can be reduced, leading to more robust and reliable proximity measures.

In examples, the signal analysis unit 5 can additionally output one or more metrics 6 in the form of metrics of the vehicle and/or the surrounding fluid flow, such as speed, flow direction and altitude based on the measured flow properties of the near-vehicle flow field 2. The metrics of the vehicle and/or surrounding fluid flow can be calculated in a variety of known ways, depending on the type of proximity sensor.

For example, if the fluid property sensors 3 are either flow velocity or pressure sensors, then the sensor values can provide a measure of the airspeed of the vehicle, as well as the bearing of the prevailing flow relative to the vehicle. For instance, if the fluid property sensors 3 are pressure sensors in the form of a plurality of open-ended tubes distributed around the vehicle, each having an open port facing directly outwardly from the vehicle and exposed to a different point within the near-vehicle flow field, then the oncoming flow direction can be determined by identifying the open port around the outer surface of the vehicle that has a sensor value indicative of the maximum pressure of the any of the pressure sensors. This is because the maximum pressure detected by the array of pressure sensors will be from the open port that is oriented directly into the oncoming flow as it will be measuring the total pressure in the same manner as the total pressure port on a pitot tube for estimating airspeed in an aircraft. A pressure port that is oriented at a 90° angle relative to the open port reading the maximum (total) pressure will read the static pressure in the same way that a static pressure port on a pitot tube does. With the known total and static pressure measurements, the vehicle airspeed can simply be obtained from the well-known pitot tube equation (see below) derived from Bernoulli's equation.

$$v = \sqrt{\frac{2(P_T - P_S)}{\rho}}$$

Where, $P_T$ is the total pressure measured by a pressure sensor having an open port facing directly into the oncoming flow, $P_S$ is the static pressure measured by a pressure sensor having an open port facing directly transverse to the oncoming flow, and $\rho$ is the air density determined using the measured static pressure, where the relation between static pressure and air density versus altitude from sea level is known.

Thus, if the orientation of the pressure ports relative to the vehicle are known, then flow direction and airspeed can be determined by identifying these total (maximum) and static pressure ports and sensor values in the manner described.

Lastly, with the known static pressure, the pressure altitude can be determined from the known variation in air pressure from sea level. In the signal processing unit 4, the raw sensor values directly from the fluid property sensors 3, in the form of pressure sensors, can be filtered with separate routines for each of the additional outputs of airspeed, flow direction and pressure altitude to maximize the respective signals. For example, moving-window averaging, band-pass filtering or Kalman filtering (amongst others) can be used to process the raw sensor values from the fluid property sensors 3 for use of the data to determine airspeed, flow direction and pressure altitude. It will be understood that pressure altitude is the altitude of the vehicle determined based on the measured pressure and a look-up table of variation of pressure with altitude.

The separately processed readings can then be concurrently analysed in the signal processing unit 5 to determine airspeed, flow direction and pressure altitude as discussed previously.

Figure 2:
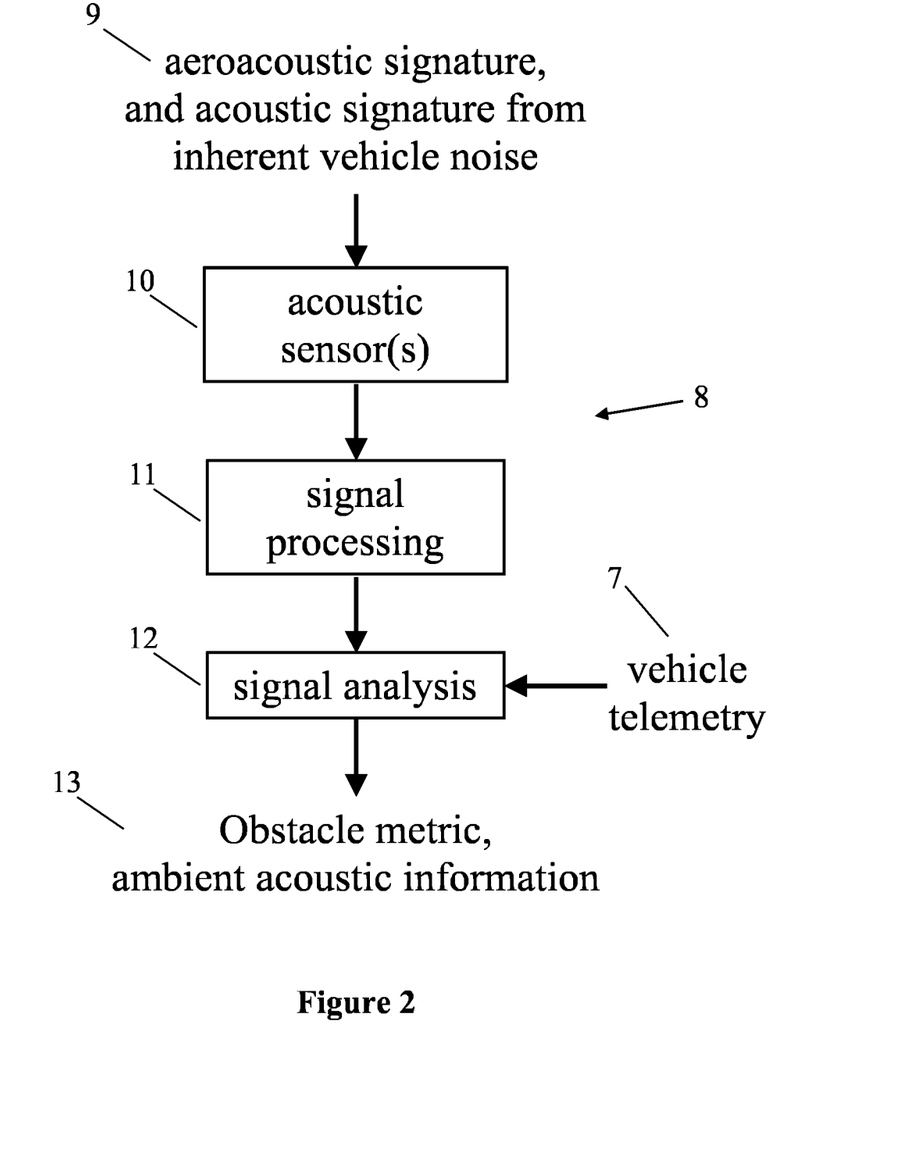
FIG. 2 is a flow diagram illustrating a further system for detecting an obstacle in the vicinity of a vehicle, based on an acoustic field around the vehicle.

FIG. 2 is a flow diagram illustrating a further system 8 for detecting an obstacle in the vicinity of a vehicle, based on an acoustic field around the vehicle. A characteristic of an environment of the vehicle, in the form of an acoustic field 2 is induced by operation of a propulsion unit of the vehicle (not shown). For example, operation of a motor of the propulsion unit of the vehicle induces a change in a characteristic of the environment of the vehicle in the form of a change in the acoustic field surrounding the vehicle. The presence of an obstacle in the vicinity of the vehicle further changes the acoustic field surrounding the vehicle.

The system 8 is for detecting an obstacle in the vicinity of a vehicle and comprises a single or array of acoustic sensors (microphones) in the form of directional acoustic sensors 10. Ambient sounds, primarily those originating from the aeroacoustics and inherent sources (i.e. power plant) 9 of the vehicle are detected as sensor readings by the acoustic sensors. As with FIG. 1, the sensor readings in this example are then subject to signal processing 11 as required using one or more filters to reduce measurement noise and maximize the signal. Signal processing 11 of the sensor readings can be effected at collection. The signal processing can be passive, using an embodied filter (using the natural dynamics of the sensor), active by changing the tuning of the acoustic sensor, or a combination of both. In particular this can include a band-pass filter to only pass the predominant frequencies that are characteristic of the aeroacoustic and inherent noise signature of the vehicle. This will avoid interfering effects from external sources so that the sensor signal will be dominated by returning reflections of sounds generated by the vehicle itself. Again, as in FIG. 1, in this example, the signal-processed sensor values are subject to signal analysis 12 to identify the presence of an obstacle in the vicinity of the vehicle. In this example, the signal analysis step 12 is configured to determine a measure of obstacle proximity to the vehicle. This can be accomplished by performing a calibration in which the sensor values are recorded for different obstacle bearings and distances. In this example, the measure of obstacle proximity can be determined based on previous calibration values of sensor readings during known conditions of obstacle proximity.

As in FIG. 1, the signal analysis 12 of the processed sensor values can also take into account telemetry information 7 from the vehicle to improve obstacle detection. This can include information from the vehicle IMU or power plant thrust levels. For example, the inherent sounds generated by the vehicle will vary with power plant thrust level. If this is not accounted for, it may lead to false detections of obstacles in the vicinity of the vehicle. In this example, the risk of false detections of obstacles is overcome by including the contributing effects in the calibration routine. For example, thrust level is an additional input to the calibration along with the acoustic sensor readings. In another example, active filtering can be used by dynamically changing the properties of the sensor in accordance with the power train properties. This would enable interfering effects from the variable operational state of the propulsion unit of the vehicle itself to be excluded, resulting in more reliable proximity detections.

In addition to detection of the presence of an obstacle in the vicinity of the vehicle, the further system 8 can also provide ambient acoustic information of interest, received by the acoustic sensors 10, as part of the output 13. For example, as part of an inspection task it may be desired to monitor and record particular sounds, such as speech. In some examples, a separate filtering routine is provided at the signal processing stage 11 of the system 8. In particular, the raw sensor values may be signal processed to maximize the signal to noise ratio for obstacle detection purposes as discussed previously, while also being separately processed to provide a particular additional output of interest, such as separately band-pass filtering to isolate frequencies relating to speech. At the signal analysis stage 12, further analyses can be separately performed on the additional output of interest, such as speech recognition.

The two separate obstacle detection systems 1, 8 for detection of the presence of an obstacle based on flow field information and vehicle acoustics respectively can be used independently or together to provide the detection of the presence of the obstacle. Of course, in some examples, the detection of the presence of the obstacle extends to providing an indication of the proximity and/or location of the obstacle relative to the vehicle. If used together, then the two proximity sensor technologies can be fused to provide a single and more reliable measure. In some examples, the similarity of the two independent measures would provide an indication of signal reliability, where if the values match then it is a reliable measure. In other examples, each of the two proximity sensor technologies can be used in different situations to provide reliable obstacle detection in a range of operational situations of the vehicle.

Figure 3:
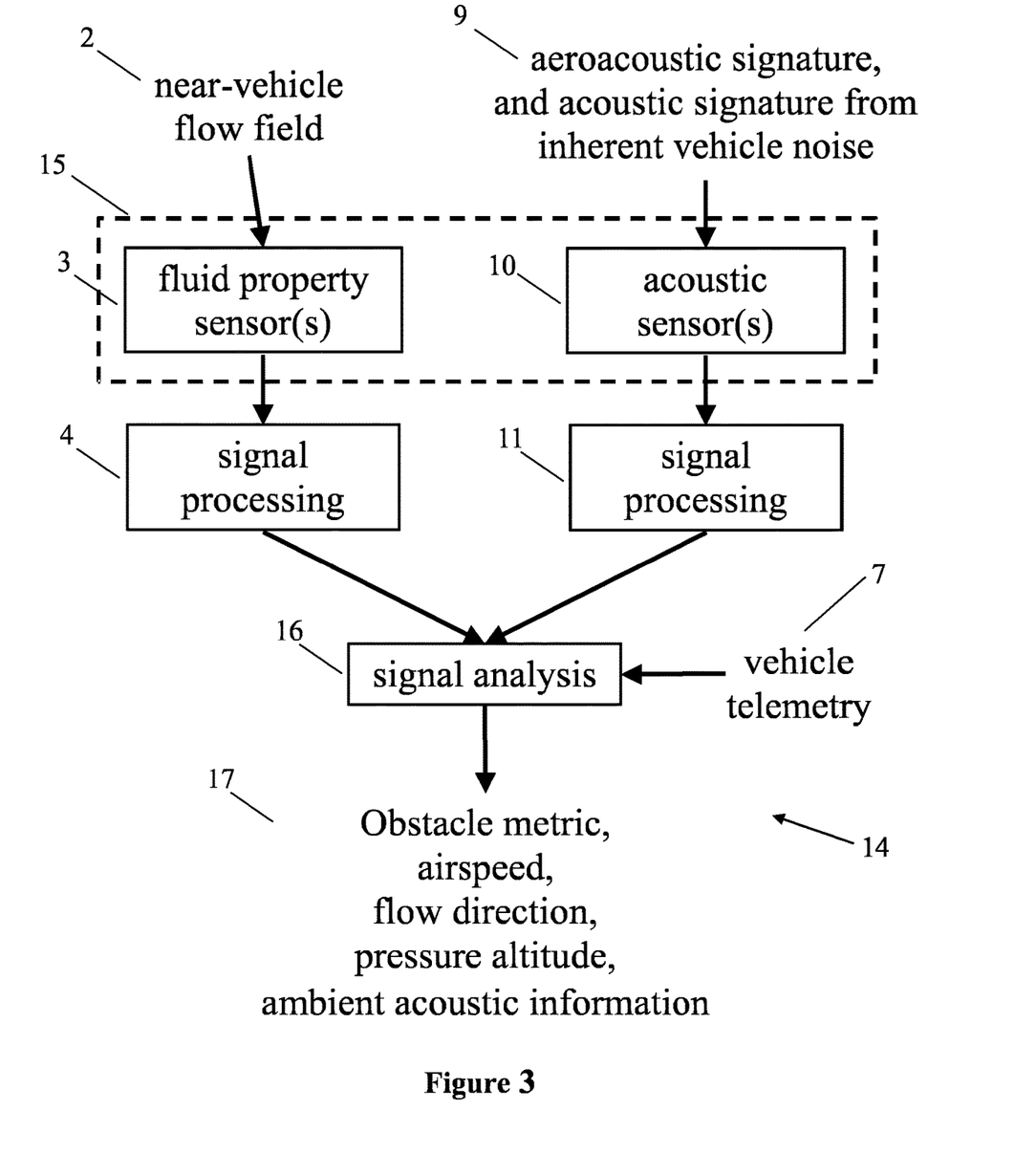
FIG. 3 is a further example of a flow diagram illustrating a system for detecting an obstacle in the vicinity of a vehicle, based on a fusion between the systems shown in FIGS. 1 and 2.

FIG. 3 is a further example of a flow diagram illustrating a system for detecting an obstacle in the vicinity of a vehicle, based on a fusion between the systems shown in FIGS. 1 and 2. The two obstacle detection systems 1 and 8 are combined together in the obstacle detection system 14 as will be described in detail below. Here, the same fluid properties sensor(s) 3 and acoustic sensor(s) 10 measure the near-vehicle flow field 2 and inherent acoustic signature 9 respectively of the vehicle. The sensor values from the fluid property sensor(s) 3 and the acoustic sensor(s) 10 are processed in separate signal processing modules 4, 11, with each signal processing module 4, 11 being substantially as described hereinbefore in relation to FIGS. 1 and 2 respectively. However, in this example obstacle detection system 14, the processed sensor values in the form of processed fluid flow sensor values and processed acoustic sensor values are analysed together in a signal analysis module 16 to in order to detect an obstacle in the vicinity of the vehicle. In some examples, as previously, the signal analysis module 16 is configured to determine a location, and/or a proximity of the obstacle relative to the vehicle. As described before, this can be accomplished with a calibration routine recording sensor values for different obstacle bearings and distances. In this example, the inputs to the calibration include both sets of fluid property sensor values and acoustic sensor values to correlate the combined readings with obstacle proximity. Thus, the accuracy of the measure of obstacle proximity is improved because either of the detection strategies (i.e. flow- or acoustic-based) may operate better or worse in certain obstacle proximity scenarios, which can be captured in the combined calibration. In examples, the acoustic sensing strategy (as done by acoustic sensor 10 of obstacle detection system 8) is better suited to detecting obstacles on a lateral side of the vehicle compared to an upper or lower surface of the vehicle. In examples, and the flow sensing strategy (as done by proximity sensor 3 of obstacle detection system 1) may perform best at detecting obstacles below the craft. Thus, the calibration can be weighted more strongly towards the signals from the acoustic sensors 10 for detecting obstacles on the sides of the craft, while the signals from the flow property sensors 3 would be weighted towards detecting obstacles underneath. In this way, the obstacle detection indication originates mainly from the sensor (regardless of type) with the strongest signal, while the influence of other sensors of a different type with weaker or interfering signals are excluded or minimized. As with the individual proximity sensors 1 and 8, additional input to the combined signal analysis 16 can include vehicle telemetry 7 to compensate for interfering effects originating from the state of the vehicle. As before, the vehicle ground speed, acceleration, attitude and power plant thrust level(s) may affect the baseline values of both the fluid property sensor 3 and the acoustic sensor 10 and result in false or missed detections of obstacle in the vicinity of the vehicle. Furthermore, the additional variables can be included as inputs to the calibration so that their effects on the measured obstacle proximity output can be minimized or eliminated.

The final outputs 17 of the obstacle detection system 14, can, in addition to an indication of whether an obstacle is present in the vicinity of the vehicle, include: airspeed, flow direction and pressure altitude originating from the flow properties sensor(s) 3 in the same manner as described previously in FIG. 1, and desired additional ambient acoustic information from the acoustic sensor(s) 10 as described previously in FIG. 2. If the flow properties sensor(s) 3 are pressure sensors, then a given flow- and acoustic-based sensor pair 3 and 10 could be combined into a single sensing element 15 capable of outputting both pressure information and acoustic information, since both outputs are based on measuring air pressure.

Figure 4A:
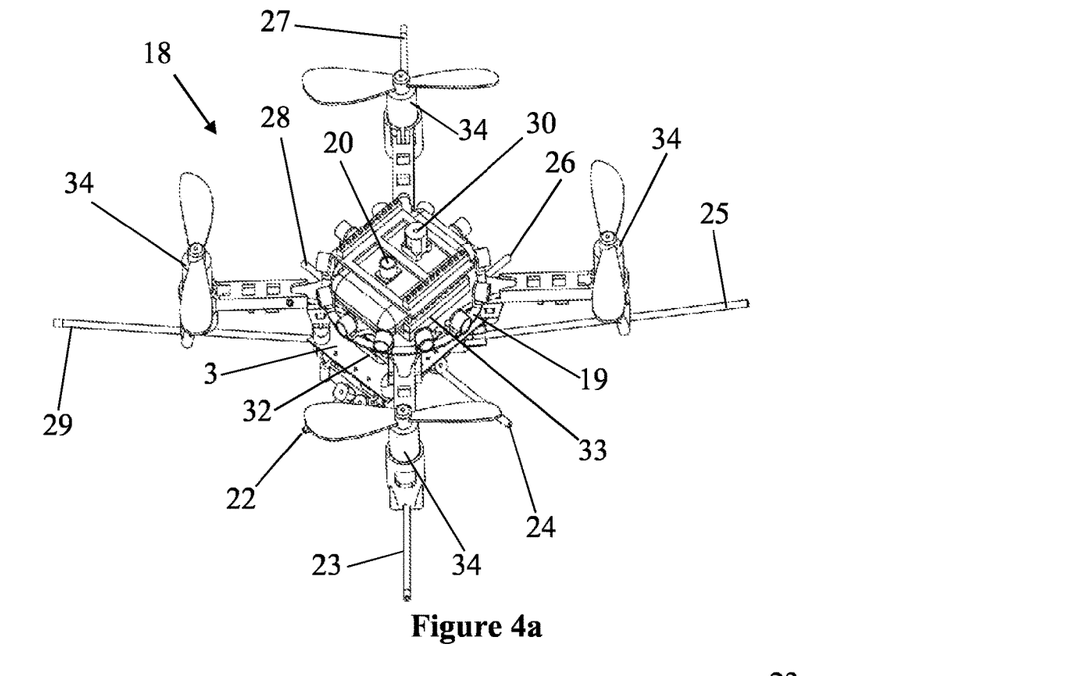
FIGS. 4 to 8 are illustrations of a vehicle comprising an obstacle detection system thereon, viewed from different angles and with obstacles shown in different locations around the vehicle.
Figure 4B:
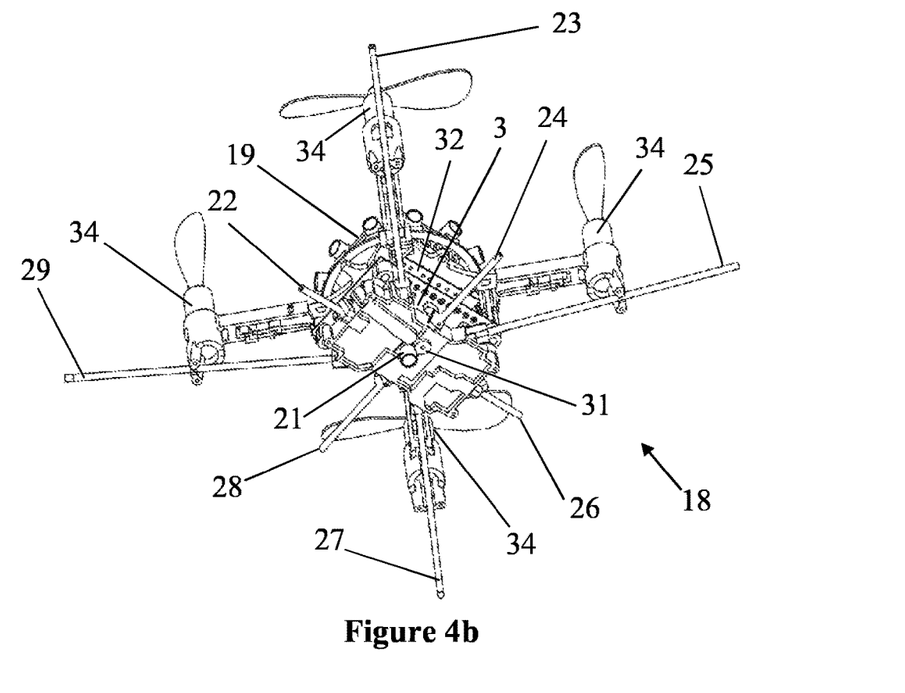
Figure 5:
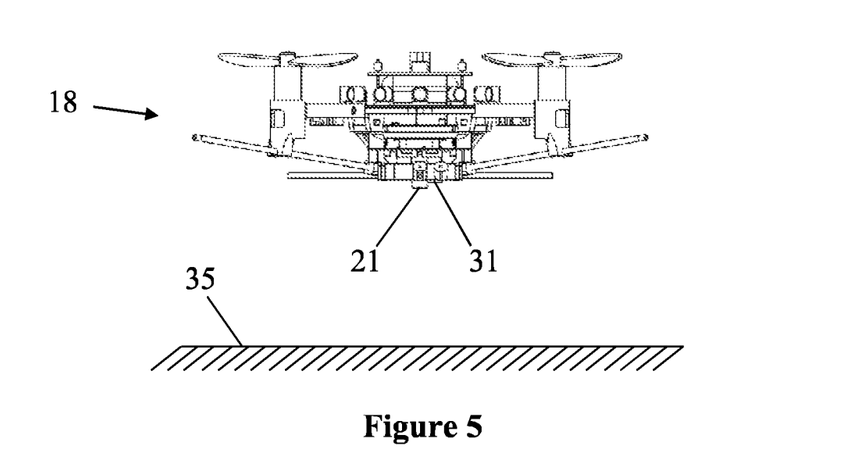
Figure 6:
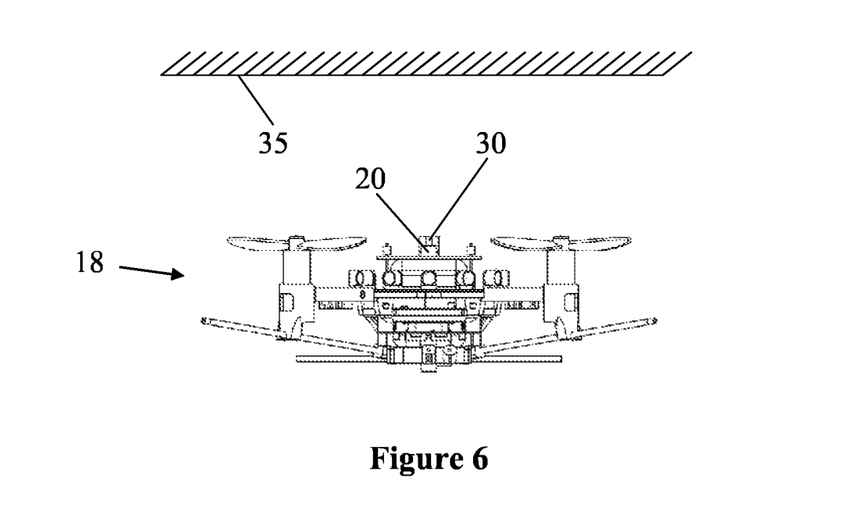
Figure 7:
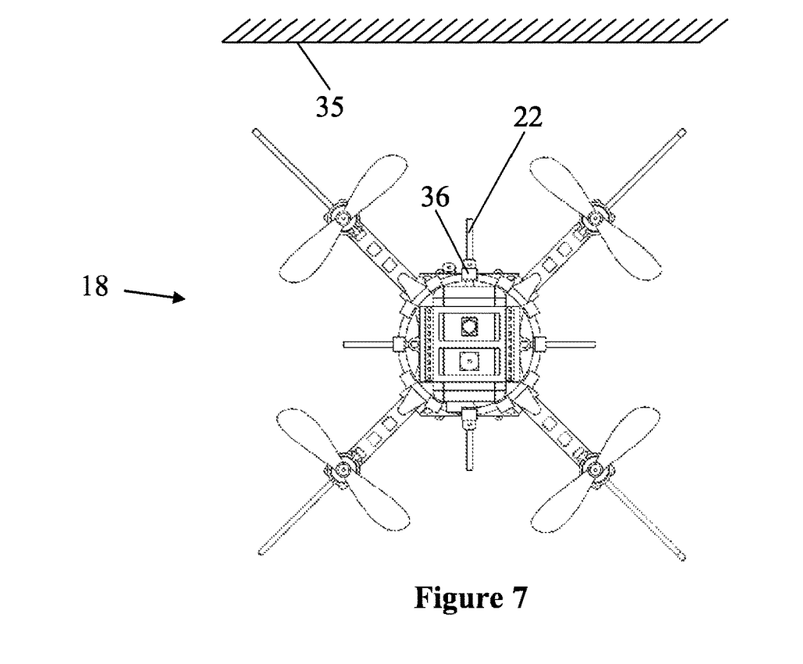

FIGS. 4 to 8 are illustrations of a vehicle comprising an obstacle detection system thereon, viewed from different angles and with obstacles shown in different locations around the vehicle. FIG. 4 shows a vehicle 18 in the form of a quadcopter comprising four individual power plants 34 in the form of motors, driving four horizontal plane rotors. The vehicle 18 further comprises an array of acoustic sensors in the form of directional microphones 19, 20, 21 and an array of pressure sensors 3 each connected to pressure ports 22, 23, 24, 25, 26, 27, 28, 29, 30, 31 distributed throughout the vehicle. Thus the sensors can detect changes in pressure around the vehicle. There are fewer acoustic sensors than pressure ports. The directional microphones and the pressure ports are oriented to provide coverage on all sides of the craft including the top and bottom. The directional microphone 19, 20, 21 and pressure sensor array 3 are in data communication with a devoted microcontroller 32. The microcontroller 32 performs all of the tasks performed in the signal processing steps 4, 11 in any of FIGS. 1 to 3 for the sensor data received from the sensors to detect the characteristic of the environment. In this example, the pressure sensors are filtered with a moving average filter to reduce measurement noise levels. Further, the acoustic sensors are band-pass filtered to only pass the dominant frequencies that are characteristic of the acoustic signature of the vehicle (from both aeroacoustic and inherent sources).

In addition to the signal processing, the microcontroller 32 also performs the signal analysis 16 of the combined sets of sensor measurements. Through the calibration routine performed to correlate sensor values with obstacle bearing and distance, and with the illustrated sensor layout, the relation between the sensor values and obstacle proximity are obtained as summarized in Table 1. For both sets of sensors, if all sensor values are holding at baseline values then no obstacle is present. In the case where the vehicle is a flying craft, if an obstacle 35 is beneath the vehicle this correlates with a deviation of the sensor readings from baseline values for the down-facing sensors 31 and 21 (see FIG. 5), where the pressure sensor port 31 experiences a pressure rise, and microphone 21 sees a rise in acoustic pressure amplitude. Likewise in the case where the vehicle is a flying craft, if an obstacle 35 is above the craft then this is marked by a deviation from baseline readings for the upwards-facing sensors 20 and 30 (see FIG. 6), which detect a pressure reduction and acoustic pressure amplitude rise respectively. For the case of an obstacle 35 being present beside the craft, whether it be in front, behind or on one of the lateral sides, this condition is correlated with a deviation in sensor value from the baseline on the side of the craft that is nearest the obstacle. Here, the pressure sensor port 22 on the near-obstacle side experiences a reduction in pressure from baseline, and the microphone 36 on the same side (see FIG. 7) sees an increase in acoustic pressure amplitude. These summarized conditions outline how the bearing of the obstacle is obtained with the known sensor layout, while the distance to the obstacle is obtained from the magnitude of the deviation of the corresponding sensor value from the baseline, which is also captured in the calibration routine to translate these magnitudes into real-life measures of distance. The speed of approach of the obstacle can be obtained by measuring the Doppler shift of the reflected sounds detected by the microphone on the near-obstacle side. Here, the magnitude and direction of the frequency shift provides a measure of obstacle velocity relative to the vehicle, and can detect slower approaches if using higher frequency components of the acoustic signal.

For the case of an obstacle 35 being present at a bearing between two of the sensors, (diagonally from the craft), this condition is correlated with a deviation in two adjacent sensor values from the baseline for the sensors nearest the obstacle. Thus, a direction to an obstacle from the craft can be determined substantially anywhere around the craft.

The vehicle further comprises a flight computer 33 in data communication with the microcontroller 32 and configured to provide vehicle telemetry 7 to the microcontroller 32. Thus, the microcontroller 32, receives vehicle velocity (ground speed), acceleration, attitude (roll, pitch, yaw angles), rotational acceleration (roll rate, pitch rate, yaw rate) from an Inertial Motion Unit (IMU) within the flight computer 33, as well as power levels in the form of thrust levels of the four power plants 34 in the form of motors. These are used as additional variables in the calibration routine to correlate sensor values to obstacle proximity. In effect, these additional inputs have the effect of shifting a reference value in the form of a 'baseline' value from which a given sensor must deviate from to denote the presence of an obstacle. For example, as the thrust level of all the motors 34 rises to make the vehicle gain altitude, the pressure on all the pressure sensor ports 22, 23, 24, 25, 26, 27, 28, 29 will drop as the induced downwash strengthens with the increased thrust, which may lead to a false determination of the presence of an obstacle. Likewise, the noise level from the motors will rise, which may also lead to a false determination of the presence of an obstacle from the acoustic-based sensors 19, 20, 21. If the calibration routine includes the additional vehicle telemetry inputs mentioned from the IMU of the flight computer 33, then as the thrust levels rise, the 'baseline' values for each of the sensors will shift accordingly to counteract this effect. Thus, in this case, with the vehicle climbing and no obstacles present, these accompanying changes in the measured pressures and acoustic pressure levels will shift along with the baseline level. In this way, it is less likely that a false determination of the presence of an obstacle will occur.

In an alternative example, dedicated sensors can be used to measure the appropriate baseline values for each of the power plants. In one example, the dedicated sensors can be microphones arranged to receive audio input from substantially only a single motor. The dedicated sensors can be located in close proximity to the power plant, and/or can be directionally focused towards the power plant. This ensures that the presence or absence of an obstacle in the vicinity of the vehicle has substantially no effect on the signals output by the dedicated sensors. Thus, any variation in audio received by the dedicated sensors can be used to modify the reference values used to determine the presence of an obstacle in the vicinity of the vehicle. In such embodiments, the microcontroller 32 need not be in direct data communication with the flight computer 33 and need not receive vehicle telemetry 7 from the vehicle. This is particularly advantageous where the obstacle detection system is to be retrofitted to an existing vehicle, having an existing flight computer 33.

Figure 8:
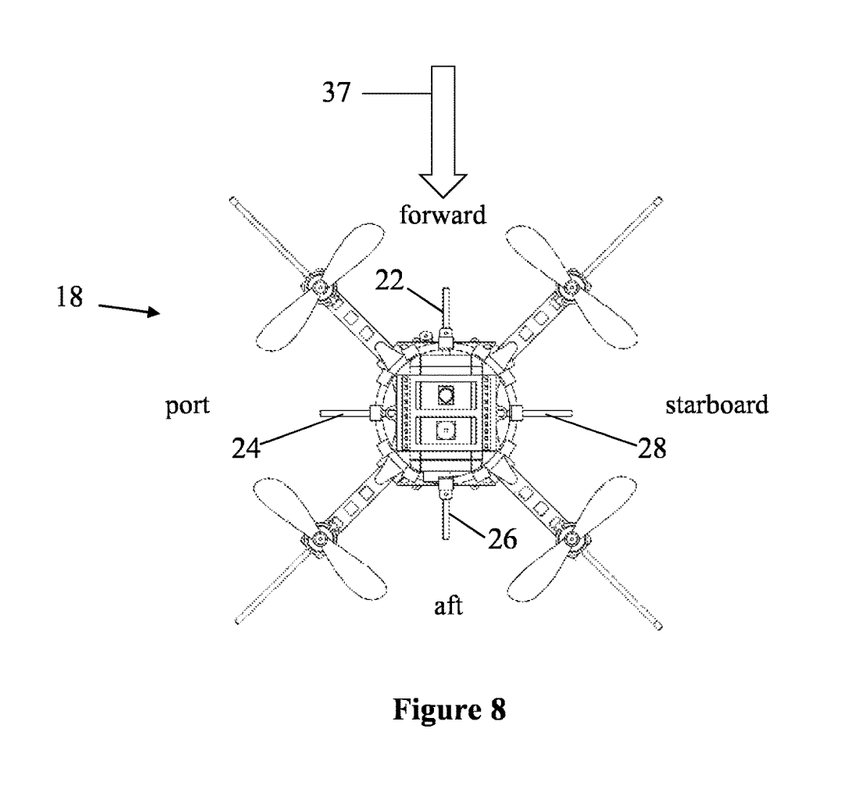

With the illustrated pressure sensor layout shown in FIGS. 4 to 8, it will be understood that the vehicle airspeed and oncoming flow direction can be determined from the pressure sensors directly, as described hereinbefore. This process is illustrated in FIG. 8, where the vehicle 18 is depicted with an oncoming flow 37 oriented relative to the vehicle as shown, where the forward, aft, starboard and port sides of the craft are as indicated. The pressure sensor port that reads the maximum pressure of the sensor array 3, will be the one that is oriented into the oncoming flow direction. In this case, pressure sensor port 22 aligns the closest with the oncoming flow direction, and hence, will read the maximum pressure. Since the orientation of the pressure port 22 is known relative to the vehicle body (along centreline in forward-aft direction), then it is known in this case that the predominant flow direction is from the forward-to-aft direction. Conversely if pressure sensor port 26 reads the maximum pressure, then the flow direction is in the aft-to-forward direction. Recall that the maximum pressure read across the sensor array, is the same as the total pressure PT. The static pressure PS of the fluid can then be determined from the pressure port(s) that lie at a 90° angle relative to the port reading the maximum (total) pressure. In this case, pressure sensor ports 24 and 28 meet this criteria, and will read the static pressure. The average of these two static pressure measures combined with the total pressure can then be used to compute the airspeed using the standard pitot tube formula (Equation 1). Since static pressure and air density follow a fixed relation with altitude from sea level, the air density (required to compute airspeed) and pressure altitude can be determined from the static pressure measurement.

Once the presence of an obstacle has been identified, and any location or proximity of the obstacle has been established, as well as any other additional parameters, such as airspeed, flow direction, and pressure altitude, these details can be sent to vehicle flight computer 33. Furthermore, as discussed hereinbefore, other desired ambient acoustic information can also be relayed to the flight computer 33. Thus, the flight controller 33 may use this information to update its flight trajectory to avoid the detected obstacle, or perform other tasks such as floor or wall following in which it is desirable to remain at a fixed proximity from a surface for inspection purposes. It will be understood that commands and algorithms for controlling a vehicle, such as an airborne craft, in response to identification of the obstacle, are known to the skilled person.

The following table illustrates the logic applied by the microcontroller 32 to determine the presence or absence of an obstacle in the vicinity of the vehicle.

TABLE 1

| Proximity condition | Flow-based sensor condition | Acoustic-based sensor condition |
|---|---|---|
| No obstacle | All sensors holding at baseline values | All sensors holding at baseline values |
| Obstacle beneath | Rise in pressure below craft (e.g. at pressure sensor port 21, FIG. 5) from baseline value | Rise in acoustic pressure amplitude below craft (e.g. at microphone 31, FIG. 5) from baseline value |
| Obstacle above | Reduction in pressure above craft (e.g. at pressure sensor port 20, FIG. 6) from baseline value | Rise in acoustic pressure amplitude above craft (e.g. at microphone 30, FIG. 6) from baseline value |
| Obstacle beside | Reduction in pressure on near-obstacle side of craft (e.g. at pressure sensor port 22, FIG. 7) from baseline value | Rise in acoustic pressure amplitude on near-obstacle side of craft (e.g. at microphone 36, FIG. 7) from baseline value |

This includes two separate strategies: 1. detecting obstacles through sensing changes in the induced flow and pressure field that are associated with the induced flow field deforming as an obstacle approaches; 2. detecting obstacles by listening to the reflections of the sounds inherently generated (i.e. motor noise) by the craft itself (a type of echolocation).

It will be understood that the microcontroller 32 can be implemented in software, hardware or a mixture of both. In one example, the microcontroller 32 is obstacle detection circuitry. In one example, the microcontroller 32 comprises at least one processor and a memory containing instructions to cause the at least one processor to carry out the operations described hereinbefore.

The presently disclosed concept operates by measuring the near-vehicle pressure field and/or acoustic pressure while filtering and processing the signals to identify the presence of an obstacle through a characteristic change in the sensor values.

In summary, there is provided a vehicle (18) comprising a propulsion unit (34) configured to move the vehicle (18) and to change a characteristic of the environment of the vehicle (18). The vehicle (18) further comprises a proximity sensor (19, 20, 21, 22, 23, 24, 25, 26, 27, 28, 29, 30, 31) configured to detect the characteristic of the environment of the vehicle. The characteristic of the environment is changed by operation of the propulsion unit (34). The vehicle (18) further comprises obstacle detection circuitry (32) configured to determine a presence of an obstacle in the vicinity of the vehicle based on a comparison between the detected characteristic of the environment and a reference value.

Throughout the description and claims of this specification, the words "comprise" and "contain" and variations of them mean "including but not limited to", and they are not intended to (and do not) exclude other integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A vehicle comprising:
a propulsion unit configured to move the vehicle and to induce a near-vehicle fluid flow field around the vehicle;
a plurality of pressure sensors configured to detect a pressure of the near-vehicle fluid flow field at a plurality of positions around the vehicle;
obstacle detection circuitry configured to determine a presence of an obstacle in the vicinity of the vehicle based on a comparison between the detected pressures of the near-vehicle fluid flow field and corresponding reference values; and
a navigation control system configured to control the propulsion unit of the vehicle to avoid the detected object,
wherein the plurality of pressure sensors are at least one chosen from a pitot tube, a strain-gauge pressure plate, and a membrane; and
wherein the obstacle detection circuitry is further configured to:
compare the detected pressure of the near-vehicle flow field to a reference value; and
determine that the obstacle is present if at least one of the detected pressures of the near-vehicle flow field differs from the reference value by more than a predetermined threshold amount.

2. The vehicle as claimed in claim 1, wherein the obstacle detection circuitry is configured to determine a distance from the vehicle to the obstacle based on the difference between at least one of the detected pressures of the near-vehicle flow field and the reference values.

3. The vehicle as claimed in claim 1, further comprising at least one microphone arranged to detect a reflection of a sound generated by operation of the propulsion unit.

4. The vehicle as claimed in claim 3, wherein the microphone is a directional microphone.

5. The vehicle as claimed in claim 3, wherein the sound is generated by a power plant of the propulsion unit.

6. The vehicle as claimed in claim 3, wherein the sound is generated by a movement of a surface of the vehicle relative to the fluid surrounding the vehicle during operation of the propulsion unit.

7. The vehicle as claimed in claim 6, wherein the surface is a surface of the propulsion unit.

8. The vehicle as claimed in claim 6, wherein the vehicle further comprises a calibration microphone, arranged to detect the sound substantially at the location of generation, and wherein the obstacle detection circuitry is configured to determine the presence of the obstacle in the vicinity of the vehicle also based on the detected sound by the microphone and the detected sound by the calibration microphone.

9. The vehicle as claimed in claim 8, wherein the surface is a surface of the propulsion unit.

10. The vehicle as claimed in claim in claim 8, wherein the obstacle detection circuitry is configured to:
compare an amplitude of the detected sound to a reference value; and
determine that the obstacle is present if the amplitude of the detected sound is greater than the reference value by more than a predetermined threshold amount.

11. The vehicle as claimed in claim 10, wherein the obstacle detection circuitry is configured to determine a distance from the vehicle to the obstacle based on the difference between the amplitude of the detected sound and the reference value.

12. The vehicle as claimed in claim 3, wherein the vehicle further comprises a calibration microphone, arranged to detect the sound substantially at the location of generation, and wherein the obstacle detection circuitry is configured to determine the presence of the obstacle in the vicinity of the vehicle also based on the detected sound by the microphone and the detected sound by the calibration microphone.

13. The vehicle as claimed in claim 3, wherein the obstacle detection circuitry is configured to:
compare an amplitude of the detected sound to a reference value; and
determine that the obstacle is present if the amplitude of the detected sound is greater than the reference value by more than a predetermined threshold amount.

14. The vehicle as claimed in claim 13, wherein the obstacle detection circuitry is configured to determine a distance from the vehicle to the obstacle based on the difference between the amplitude of the detected sound and the reference value.

15. The vehicle as claimed in claim 1, wherein the obstacle detection circuitry is further configured to determine a position of the obstacle relative to the vehicle.

16. The vehicle as claimed in claim 1, wherein the vehicle is an airborne vehicle.

17. An apparatus for detecting an obstacle in the vicinity of a vehicle having a propulsion unit, the apparatus comprising:
a plurality of pressure sensors configured to detect a pressure of a near-vehicle fluid flow field at a plurality of positions around the vehicle during use;
obstacle detection circuitry configured to determine a presence of the obstacle in the vicinity of the vehicle based on a comparison between the detected pressures of the near-vehicle fluid flow field and corresponding reference values, where the obstacle is determined to be present if at least one of the detected pressures of the near-vehicle flow field differs from the corresponding reference values by more than a predetermined threshold amount; and
a navigation control system configured to control a propulsion unit of the vehicle to avoid the detected obstacle.

18. A non-transitory computer readable medium storing a program thereon to cause a processor to execute an obstacle detection method of a vehicle, the obstacle detection method comprising:
receiving a plurality of signals from a plurality of pressure sensors configured to detect a pressure of a near-vehicle fluid flow field at a plurality of positions around the vehicle;
determining a presence of an obstacle in the vicinity of the vehicle based on a comparison between the detected pressures and corresponding reference values, where the obstacle is determined to be present if at least one of the detected pressures of the near-vehicle flow field differs from the corresponding reference values by more than a predetermined threshold amount; and
outputting a control signal for a navigation control system of the vehicle to avoid the detected obstacle.

19. A method of determining a presence of an obstacle in the vicinity of a vehicle, the method comprising:
operating a propulsion unit of the vehicle to move the vehicle, wherein operating the propulsion unit induces a near-vehicle fluid flow field around the vehicle;
detecting a pressure of the near-vehicle fluid flow field at a plurality of positions around the vehicle with a pressure sensor;
determining the presence of the obstacle in the vicinity of the vehicle based on a comparison between the detected pressures and corresponding reference values, where the obstacle is determined to be present if at least one of the detected pressures of the near-vehicle flow field differs from the corresponding reference values by more than a predetermined threshold amount; and
controlling a navigation control system of the vehicle to avoid the detected obstacle.

* * * * *